May 16, 1939.　　　　C. THIEM　　　　2,158,160
OVEN CONTROL
Filed Aug. 26, 1937　　2 Sheets-Sheet 1
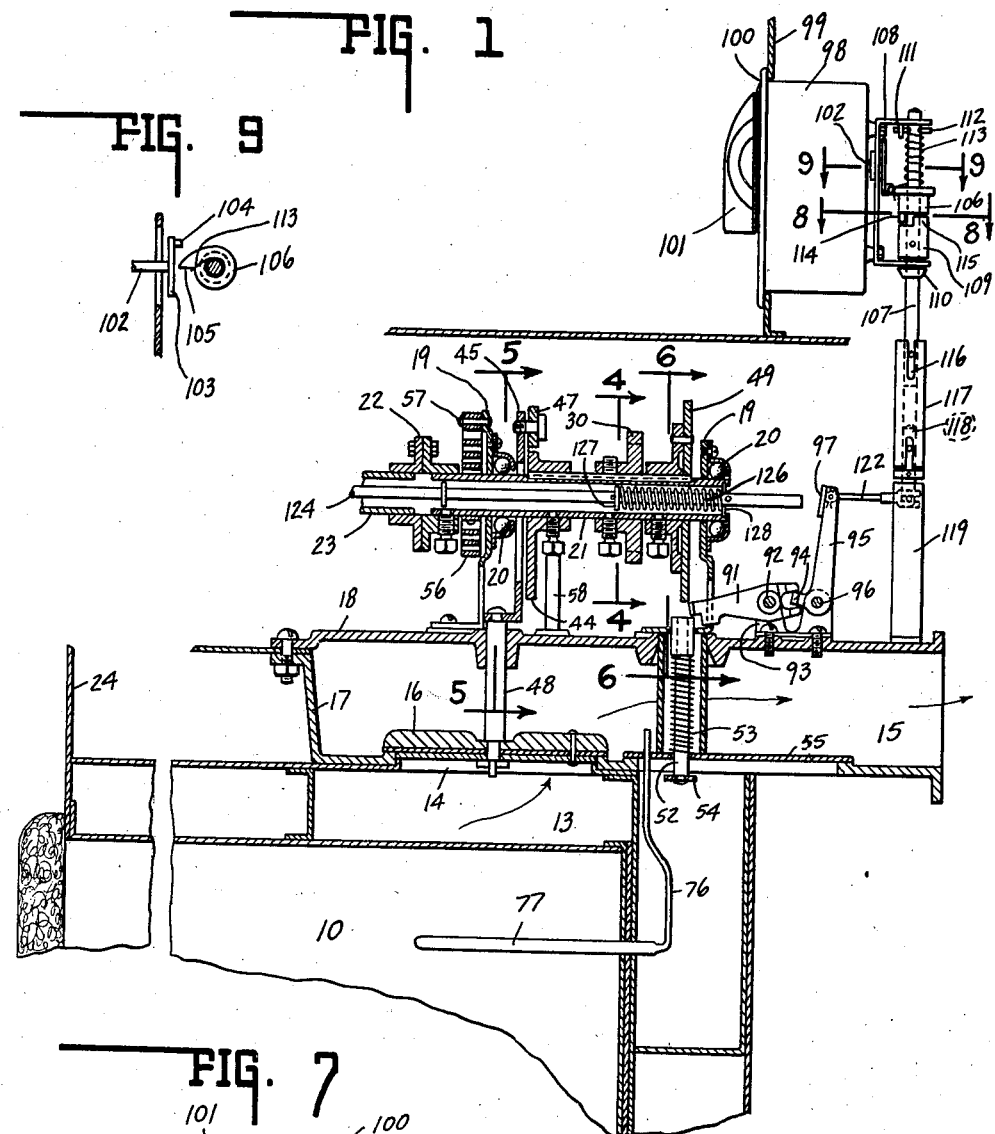
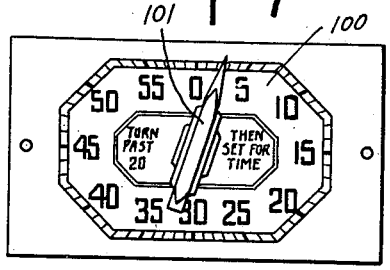
INVENTOR.
CARL THIEM.
BY Lockwood Goldsmith & Galt
ATTORNEYS.

May 16, 1939.  C. THIEM  2,158,160
OVEN CONTROL
Filed Aug. 26, 1937    2 Sheets-Sheet 2
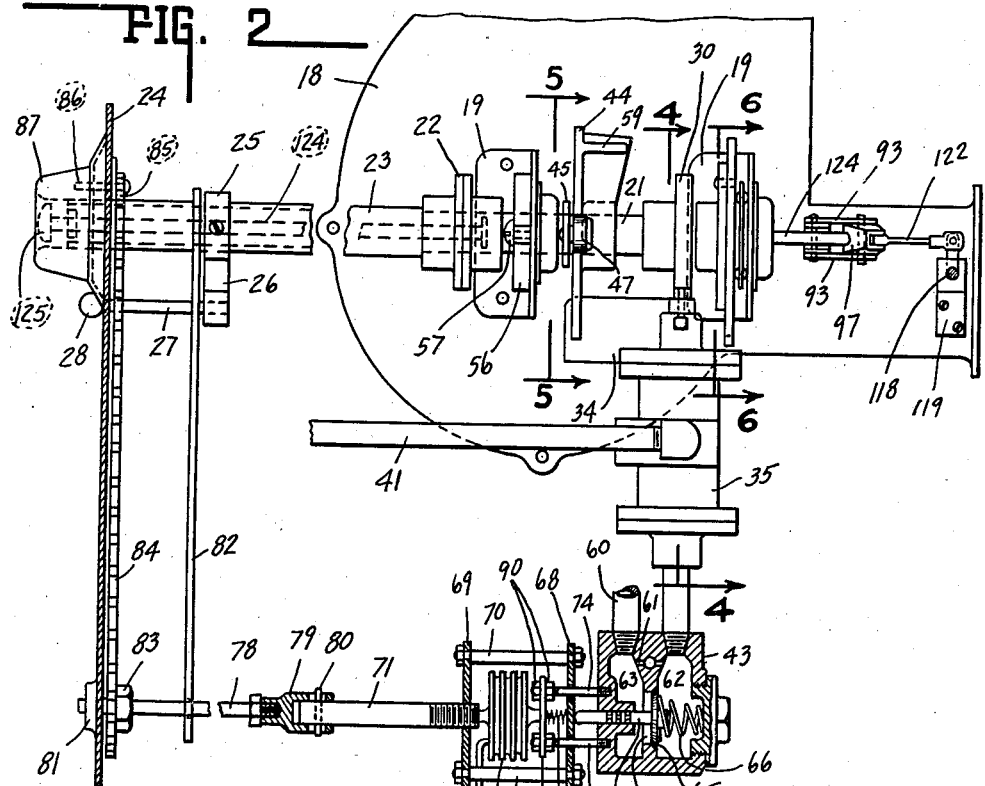
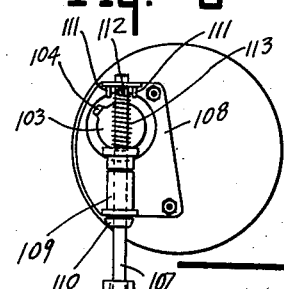
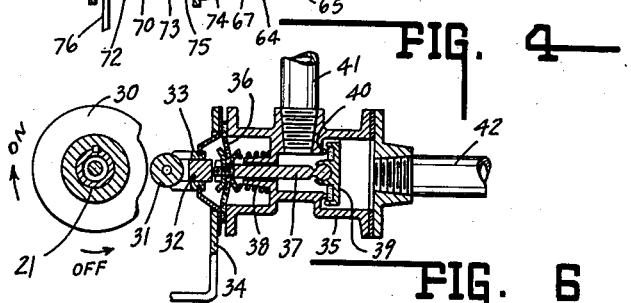
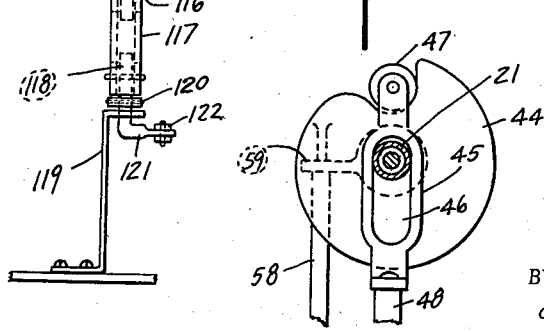
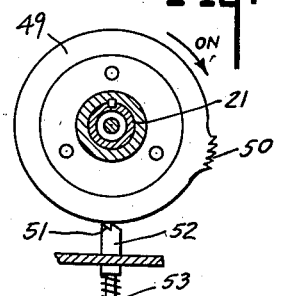
INVENTOR.
CARL THIEM,
BY Lockwood Goldsmith & Galt
ATTORNEYS.

Patented May 16, 1939

2,158,160

UNITED STATES PATENT OFFICE 2,158,160

OVEN CONTROL

Carl Thiem, Greentown, Ind., assignor to Globe American Corporation, Kokomo, Ind., a corporation Application August 26, 1937, Serial No. 160,994

1 Claim. (Cl. 161—1)

This invention relates to an oven control similar in general principles to that disclosed in copending application of Alden P. Chester, Serial No. 75,146, filed April 18, 1936.

In said copending application there is disclosed a combination of thermostatic and timed control for an oven in which both the rate of heat supply and the time of heat supply to an oven are automatically controlled to produce uniform cooking results. Heat is supplied to the oven at a predetermined rate thermostatically controlled and the supply of heat is shut off after a predetermined time interval. At the same time, the circulation of air about the oven is shut off to permit the oven to continue cooking on retained heat. To this end there is provided a thermostatically controlled valve designed to control the admission of fuel to maintain a predetermined oven temperature after the oven has been heated, combined with a second valve arranged to shut off the heat supply at the end of a predetermined time. Operating with the second mentioned valve there is a vent closure which shuts off the circulation of products of combustion at the same time the fuel supply is stopped. This effectively retains a large amount of heat in the oven and permits the same to continue cooking on the retained heat for a considerable length of time. The time of cooking on retained heat is, of course, dependent on the temperature within the oven at the time of fuel shut-off and may be accurately determined by setting the thermostatic valve to maintain the necessary temperature prior to shutoff.

One object of the present invention is to provide an improved mechanism for operating the time control of fuel shutoff and vent closure.

Another object is to provide mechanical means as distinct from electrical means for operating said time control.

Other objects and features of the invention will be understood from the accompanying drawings and the following description and claim:

Fig. 1 is a vertical sectional view of a part of an oven control having the invention applied thereto. Fig. 2 is a plan view thereof partly in section. Fig. 3 is an elevational view of the mechanism used for operating the time control. Fig. 4 is a sectional view taken substantially on the lines 4—4 of Figs. 1 and 2. Fig. 5 is a sectional view taken on the lines 5—5 of Figs. 1 and 2. Fig. 6 is a similar view taken on the lines 6—6 of Figs. 1 and 2. Fig. 7 is an elevational view of a clock used for the timing operation. Fig. 8 is a sectional view taken on the line 8—8 of Fig. 1. Fig. 9 is a sectional view on the line 9—9 of Fig. 1.

In Fig. 1, there is shown, by way of illustration, a portion of a gas burning cook stove having an oven chamber 10 which is preferably of the type sealed from contact with the products of combustion, although the invention is equally applicable to the type of oven in which the products of combustion pass through the oven. Beneath the oven chamber there is a burner chamber (not shown) having a burner of any desired form. The products of combustion pass upwardly about the sides of the oven to a chamber 13 above the same from which they may be discharged through a vent opening 14 to a passage 15 when a vent closure 16 is elevated. The passage 15 may be connected to a chimney or other suitable disposal apparatus.

The passage 15 is preferably formed by a pair of castings 17 and 18, the casting 17 containing the vent opening 14 and the casting 18 supporting the principal parts of the control apparatus. The casting 18 has secured thereto a pair of upright brackets 19 which carry ball bearings 20 rotatably supporting a tubular shaft 21. The shaft 21 is connected by means of a semi-flexible coupling 22 to a similar shaft 23 extending toward the front of the stove. The shaft 23 finds a bearing in the front plate 24 of the stove, as best seen in Fig. 2. Near the front end of the stove there is provided a collar 25 fixed to the shaft 23 and having an arm 26 to which there is fastened a pin 27 which terminates in a knob 28 extending through a slotted opening in the front plate 24. By means of the knob 28 the shafts 23 and 21 may be rocked through a desired angle.

The shaft 21 has secured thereto a cam 30 adapted to engage a roller 31 secured to the end of a stud 32. The stud 32 is slidably mounted in a bushing 33 carried upon a bracket 34 in turn mounted upon the casting 18. A valve body 35 is likewise secured to the bracket 34, a flexible diaphragm 36 being interposed between the valve body and the bracket. A valve stem 37 is secured to the diaphragm 36 and abuts at one end against the stud 32, being retained in engagement therewith by a spring 38. The valve stem 37 carries a valve member 39 engaging a seat 40. An inlet pipe 41 for the valve 35 leads from any suitable fuel supply, such as a gas main, and the outlet pipe 42 thereof leads to a thermostatically controlled valve 43.

By means of the construction just described, the valve 35 may be opened by moving the knob 28 clockwise from the "off" position shown in Fig. 2 to an "on" position, the cam 30 in this movement engaging the roller 31 to press the valve member 39 to the right in Fig. 4.

The shaft 21 also carries a cam 44 shaped as best seen in Fig. 5. A vertical slide 45 having an opening 46 straddling the shaft 21 carries a roller 47 engaging the surface of the cam 44. The lower end of the slide 45 is bent as shown in Fig. 1 and has secured thereto a vertical stem 48 upon which is mounted the vent closure 16. The cam 44 is in the position shown in Fig. 5 when the knob 28 is in the "off" position. When the knob 28 is turned to the "on" position, the roller 47 rides on the edge of the cam 44 which is so shaped that the vent closure 16 is lifted from the vent opening 14 to permit circulation of the products of combustion.

The shaft 21 also carries a disc 49 having one or more projecting teeth 50 engageable with a similar tooth or teeth 51 on the upper end of a stem 52. The stem 52 is normally pressed upwardly by a spring 53 bringing the teeth into engagement with the surface of the disc 49. The upward movement of the stem 52 is limited by a washer 54 secured to the lower end thereof and engaging a plate 55 secured to the casting 17. When the knob 28 is in the off position shown in Fig. 2, the disc 49 is in the position shown in Fig. 6. When knob 28 is moved to the on position, the disc 49 is rotated to bring the teeth 50 into engagement with the teeth 51, thus retaining the shaft 21 in the on position until the stem 52 is depressed by means to be hereinafter described.

A flat coil spring 56 has one end secured to the shaft 21 and the other end secured by means of a screw 57 to the bracket 19. This spring is so arranged that it resists movement of the shaft 21 to the on position and serves to return said shaft to the off position when the stem 52 is depressed to release the teeth 50 and 51. In this return movement, the valve 35 and the vent opening 14 are automatically closed. The return movement is limited by a stop 58 mounted on the casting 18 and engaging a projection 59 formed on the rear surface of the cam 44. Thus the teeth 50 and 51 constitute a latch retaining the vent closure and valve 35 in the open position until stem 52 is depressed.

The thermostatic valve 43 receives its fuel supply from the valve 35 through pipe 42 and discharges to a pipe 60 which leads by any convenient route to the oven burner. The valve is provided with a by-pass 61 which supplies sufficient fuel to keep a minimum flame even though the valve itself is closed. The interior of the valve as shown in Fig. 2 is divided into two chambers 62 and 63 having a valve opening 64 therebetween which may be closed by a valve member 65 urged into closing position by a spring 66. A stem 67 abutting against the valve member 65 leads through a suitable opening in the valve body and engages a plate 68. The plate 68 is rigidly secured to a second plate 69 by means of bolts 70 and the plate 69 is threadedly engaged by a stem 71 abutting at its inner end against a thermostat bellows 72. The bellows 72 abuts at its opposite end against a statioary plate 73 secured to the valve body 43 by bolts 74. A compression spring 75 is interposed between the plates 73 and 68. The thermostat bellows has connected thereto the usual tube 76 leading to a thermostat bulb 77 (Fig. 1) which is placed in any convenient position within the oven.

The bulb 77 is filled with the usual volatile fluid which exerts increasing internal pressure within the bellows 72 with increasing temperature at the bulb 77. By this means, an increase of temperature in the oven expands the bellows 72, pressing the stem 71 and the plates 69 and 68 to the left in Fig. 2 against the action of the spring 75, thus releasing the stem 67 and permitting the spring 66 to close the valve. Similarly, a decrease of temperature in the oven permits the bellows to contract and the spring 75 then presses the plate 68 against the stem 67 and opens the valve. The pressure of the spring 75 determines the temperature at which the valve will be entirely closed and, what is equally important, it determines the amount of valve opening prior to reaching this temperature. With a given pressure on spring 75, the thermostatic valve is, therefore, operated to raise the temperature of the oven to a predetermined degree at a predetermined rate and to thereafter hold the oven at that temperature by repeated opening and closing of the valve until the fuel supply is shut off by the closure of valve 35.

In order to change the temperature for which the thermostat is set and the rate of temperature increase, it is only necessary to rotate the stem 71, thus increasing or decreasing the pressure on the bellows 72 and the spring 75. To accomplish this adjustment, there is provided a shaft 78 coupled to the stem 71 by means of a coupling 79 having pin-and-slot connection 80 with the stem 71 which permits the stem to move longitudinally. The shaft 78 finds a bearing 81 in the front plate 24 of the stove and finds another bearing in a spacer 82 which extends between the shaft 23 and the shaft 78, both shafts being rotatable therein. A sprocket 83 is fixed to the shaft 78 and carries a chain 84 connected to a similar sprocket 85 rotatable on the shaft 23. The sprocket 85 is connected by means of a pin 86 to a knob 87, likewise rotatable on the shaft 23. The pin 86 passes through a suitable slotted opening in the front plate 24. The knob 87 is provided with suitable graduations registering with an arrow or other index on the front plate to indicate the temperature at which it is desired to maintain the oven before the fuel supply is turned off. The spring 75 is so adjusted by means of lock nuts 90 that the thermostatic valve 43 will be operated to hold the desired temperature as indicated by these graduations when once this temperature has been reached.

For many purposes, the type of thermostat control described in detail above is not necessary. For example, a common form of snap action thermostat which alternately fully opens and closes its valve may be combined with a permanently burning pilot adjacent the oven burner to produce satisfactory results.

In order to trip the valve 35 and close the vent 16 when the desired temperature has been reached and maintained for the proper length of time, there is provided a lever 91 pivotally mounted at 92 upon a bracket 93 secured to the casting 18. One end of said lever is positioned to engage the upper end of the stem 52 to press the same downwardly. The opposite end of said lever is formed as a fork and engages one arm 94 of a bell crank lever 95. The last mentioned lever is pivotally mounted at 96 upon the bracket 93 and has an arm 97 extending upwardly.

For controlling the time of shutoff of the fuel and vent, there is provided a clock 98 which is suitably mounted on a back plate 99 of the stove, preferably above the oven and in an accessible position. The clock 98 is of a common commercial form provided with a dial 100, and a pointer 101 and has the usual time train and alarm train, each operated by an independent spring. The dial 100 is provided with graduations arranged in clockwise order from a zero position at the top. The graduations preferably indicate one hour's time. In the operation of the clock, the pointer 101 is turned clockwise to a graduation corresponding to the time of heat supply desired. This clockwise movement of the pointer winds both the time spring and the alarm spring. The time spring then runs the pointer counterclockwise until the zero position is reached, whereupon the alarm train is released and the alarm shaft is rotated. The type of clock just described is a common commercial article and for that reason the details thereof are not shown in the drawings.

The alarm shaft 102 of the clock carries a disc 103 having a projection 104. The projection 104 is adapted to engage a projection 105 carried by a sleeve 106 which is rotatably mounted on a vertical stem 107. The vertical stem 107 is rotatably mounted on a bracket 108 secured to the back of the clock 98 and longitudinal movement thereof is prevented by a pair of collars 109 and 110 secured thereto. Rotational movement of the stem 107 is limited by stop pins 111 carried by the bracket 108 and engaging a pin 112 carried by the stem 107. A torsion spring 113 surrounds the upper end of the stem 107 and has one end engaging the pin 112 and the other end engaging the projection 105. Said spring normally urges the collar 106 in a clockwise direction on said stem.

The collar 106 carries a downward projection 114, best seen in Fig. 8, which is adapted to engage an upward projection 115 on the collar 109. The upward projection 115 is preferably semicircular in form, while the downward projection 114 occupies considerably less than a semicircle and thus provides lost motion between said collars. The spring 113 normally retains said projections in the position shown in Fig. 8, in which position the projection 105 is in the path of the projection 104. With the parts in this relation, counterclockwise rotation of the disc 103 causes the projection 104 to strike projection 105 and to rotate the collar 106 and the stem 107 in the clockwise direction. In a clockwise rotation of the disc 103, however, the projection 104 engages projection 105 on the opposite face and merely turns the collar 106 on the stem 107 against the action of spring 113 without rotating the stem 107, said stem being held against rotation by one of the stop pins 111. When the alarm train has not been wound, the projection 104 occupies a position such as shown in Fig. 9. In the winding of the alarm spring, the disc 103 is rotated clockwise until projection 104 has passed projection 105. Thereafter, when the alarm is tripped, the unwinding of its spring rotates the disc 103 in the counterclockwise direction to cause the projection 104 to strike projection 105 and to rotate the stem 107. In order that projection 104 may pass projection 105 in the winding of the alarm train, the pointer 101 must be moved at least a predetermined distance, preferably past the graduation indicating 20 minutes. If a smaller time is to be used, the pointer may then be returned to the proper graduation without moving the disk 103.

The stem 107 has a pin-and-slot connection 116 at its lower end with a sleeve 117 which in turn is similarly connected to a vertical stem 118 pivotally mounted on a bracket 119. Downward movement of the stem 118 is prevented by a collar 120. The sleeve 117 provides an extensible connection which permits the clock 98 to be mounted at any desired height to fit various designs of stoves and also acts as a partial universal joint. By means of this connection, rotation of the stem 107 causes similar rotation of the stem 118. The lower end of the stem 118 is outwardly bent as shown at 121 and is connected by a link 122 with the upper end of the lever arm 97.

By means of the construction just described, the clock 98 may be set with its pointer 101 on a graduation corresponding to any desired period of time. At the conclusion of that period, the alarm train is tripped, disc 103 is rotated, projection 104 strikes projection 105 to rotate the collar 106 and stem 107. Rotation of stem 107 rotates stem 118 and pulls the link 122 to the right in Fig. 1. The movement of link 122 rocks the bell crank 95 which in turn presses the lever 91 down on the upper end of the stem 55, thus disengaging the latch teeth 50 and 51 and permitting spring 56 to shut off the fuel and to close the vent 16. In Fig. 1 the position of parts is shown at the instant of this operation.

In the operation of the oven, the clock pointer is first set to the desired time for fuel supply and the knob 28 is then set in position to open the valve 35 and vent 16. The knob 87 is turned to the proper position for the desired oven temperature. The oven burner is then lighted and the oven temperature will be raised at a predetermined rate to the desired temperature and will be maintained at the temperature until the clock has returned the pointer to the zero position. When this occurs, the alarm train of the clock is tripped and the valve 35 and vent 16 are closed, as previously described. Thereafter, the oven continues to cook on retained heat for an appreciable predetermined period since all circulation of air or other gas around the oven is stopped by the vent closure.

In order to close the valve 35 and vent 16 manually, there is provided a stem 124 extending completely through the tubular shafts 21 and 23 and terminating in a button 125 inset in a recess in the knob 87. The stem 124 is normally pressed to the left in Figs. 1 and 2 by a compression spring 126 abutting against a washer 127 secured to said stem and against a washer 128 secured in the end of the tubular shaft 21. When the button 125 is manually pressed, the stem 124 engages the lever arm 97 and moves the lever 91 to trip the valve and vent closure in the same manner as done by the clock 98.

While the foregoing specification describes in detail a preferred form of the invention, the construction thereof may be varied by those skilled in the art without departing from the scope of the invention as defined by the appended claim. For example, the invention is not to be limited to gas stoves. It is equally applicable to stoves using other types of fuel and certain features thereof are applicable to electrically heated ovens. In the claim, the word "fuel" is intended to include electric current and the "lines" and "valves" include the equivalent conductors and switches for use with an electric heater. The invention is also applicable to ovens heated by coal, wood or similar fuel of the type disclosed in copending application of William D. Harvey and Alden P. Chester, Serial No. 65,993, filed February 27, 1936, now Patent No. 2,102,459. In such ovens, the supply of heat to the oven is controlled by a damper which may be opened or closed by the mechanism herein described to cut off the heat supply.

The invention claimed is:

In an oven control having means controlling the supply of heat to the oven, said means being normally biased in a direction to shut off said heat supply, and a latch normally retaining said means in heat supplying position, the combination of a clock mechanism having an alarm shaft rotatable in one direction by said clock mechanism at the end of a predetermined period of time, and manually rotatable in the opposite direction in the winding of said clock mechanism, a striker carried by said alarm shaft and rotatable thereby, a stem mounted for limited rotative movement about its axis, a member mounted on said stem and having limited rotative movement thereon, resilient means normally retaining said member at one limit of its rotative movement, whereby further movement thereof moves said stem, and connections between said stem and said latch by means of which said latch is tripped to permit said controlling means to shut off said heat supply when said shaft is rotated in the first direction, said member having a projection normally in the path of said striker and being moved thereby to trip said latch when said alarm shaft is moved in the first mentioned direction and being moved upon said stem against the action of said resilient means when engaged by said striker in its movement in the second direction.

CARL THIEM.